T. J. FAY.
PACKING RING.
APPLICATION FILED FEB. 25, 1914.

1,284,279.

Patented Nov. 12, 1918.

WITNESSES:
R. L. Bruck.
Archer W. Richards

INVENTOR,
Thomas J. Fay.
Hull A. Smith.
ATTYS.

UNITED STATES PATENT OFFICE.

THOMAS J. FAY, OF BROOKLYN, NEW YORK, ASSIGNOR, BY MESNE ASSIGNMENTS, TO THE STANDARD PARTS COMPANY, OF CLEVELAND, OHIO, A CORPORATION OF OHIO.

PACKING-RING.

1,284,279. Specification of Letters Patent. Patented Nov. 12, 1918.

Application filed February 25, 1914. Serial No. 820,803.

*To all whom it may concern:*

Be it known that I, THOMAS J. FAY, a citizen of the United States, residing at Brooklyn, in the county of Kings and State of New York, have invented a certain new and useful Improvement in Packing-Rings, of which the following is a full, clear, and exact description, reference being had to the accompanying drawings.

This invention relates to metallic packing rings such as are employed with pistons or similar cylindrical bodies for the purpose of forming a substantially fluid tight bearing between such a body and the surrounding cylindrical wall with which the body reciprocably coöperates.

The rings commonly used with such bodies are of the "split" type and are applied to their respective grooves by forcing the ring over and along the body, with its ends separated a distance dependent upon the difference between the circumference of the body and the circumference of the groove forming the seat for the ring, until the ring reaches its groove or seat when, owing to the resilience inherent in the metal of which the ring is composed, it "snaps" into place within the groove. It will be evident that, with rings of substantially the same thickness, the distortion to which they are subjected during their application to a body will vary inversely with the diameter of such body, so that, while it is possible to slip a ring of a certain material over a body of relatively large diameter without exceeding the elastic limit of the material, it may be altogether impossible to use a ring of the same material on a body of considerably smaller diameter, since the relative distortion of the ring in the latter case is much greater than in the former and the elastic limit of the material used therein may be greatly exceeded.

It is the purpose of this invention to provide a packing ring which is adapted for use with bodies of relatively small diameter (such as sliding sleeve valves and pistons for small-bore cylinders); also to produce a ring of this character of great heat-resisting capacity, whereby the ring will be able to withstand high temperatures without losing its elasticity; also to produce a ring which is particularly free from abrasion.

Figure 1:
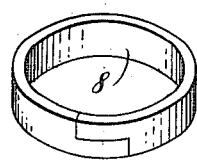
Figure 3:
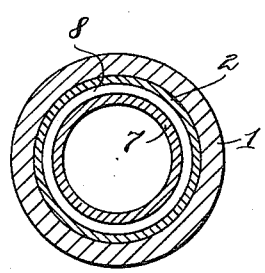
Figure 2:
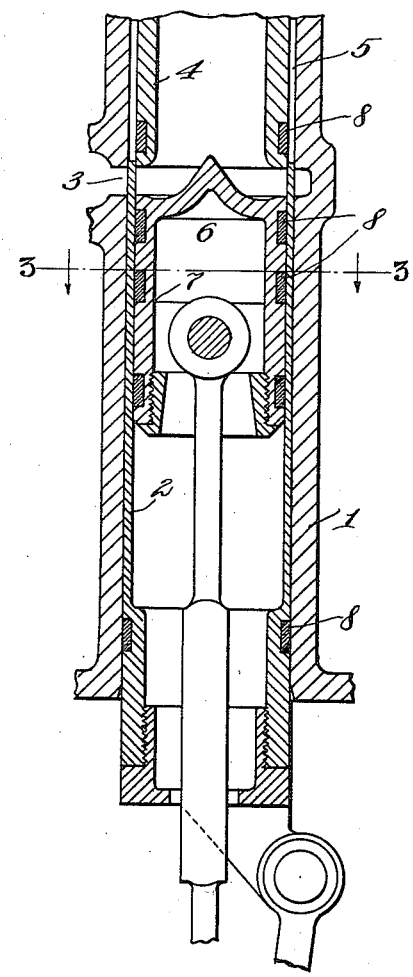

In the drawings forming part hereof Figure 1 represents a packing ring such as is employed with cylindrical bodies of small diameter; Fig. 2 a detail in section through the valve mechanism of an internal combustion engine, the mechanism in this case being such as shown in my application No. 777,394 filed July 5, 1913; and Fig. 3 a sectional view corresponding to line 3—3 of Fig. 2.

In these drawings, 1 denotes the outer annular valve sleeve or casing, 2 the reciprocating sliding sleeve valve within the casing and coöperating at its upper end with the port 3 leading to the engine cylinder (not shown). 4 denotes a depending guide sleeve within the upper end of the casing 1 and forming therewith an annular guide way 5 for the upper end of the valve sleeve, while 6 denotes a piston-like abutment within the valve sleeve, the skirt 7 forming with the surrounding casing a guide-way for the lower portion of the valve sleeve. The lower end of the guide sleeve 4 is provided with a packing ring 8 and the skirt or cylindrical portion of the abutment 6 is shown as provided with three such packing rings, while the lower portion of the sliding sleeve valve is also provided with such a packing ring.

The drawing shows the valve parts and ring in full size and it will be apparent that, in order to apply packing rings (particularly of the requisite thickness) to any of the places shown in the drawings, it is necessary to separate the ends of the rings a relatively great distance and to subject the rings to a like relatively great distortion while slipping them over the bodies with which they coöperate. Furthermore, it is evident that the rings are subjected to exceedingly high temperatures, with corresponding liability to abrasion and loss of elasticity.

I have found that, by making the rings of tungsten steel wherein the tungsten constitutes from eighteen to twenty-five per cent. of the total weight of the steel, I am enabled to employ rings which are an eighth of an inch in thickness, slip them over bodies of the dimensions shown in the drawings and that notwithstanding the relatively high distortion to which the rings are necessarily subjected in slipping them over and along their respective bodies, the elastic limit of the rings is not exceeded, no permanent "set" or distortion takes places, and the rings "snap" into place within their grooves.

Furthermore, I find that no material abrasion of the rings takes place and that they retain their elasticity notwithstanding the exceedingly high temperatures to which they are subjected.

Having thus described my invention, what I claim is:—

1. As a new article of manufacture, a split packing ring constructed of steel containing in its composition a percentage of tungsten.

2. As a new article of manufacture, a split packing ring for sliding valves of internal combustion engines, said ring being of relatively small diameter and composed of tungsten steel wherein the proportions of tungsten are from eighteen to twenty-five per cent. of the weight of the steel.

In testimony whereof, I hereunto affix my signature in the presence of two witnesses.

THOMAS J. FAY.

Witnesses:
J. B. HULL,
P. A. CONNOLLY.